(12) United States Patent
Kurosawa

(10) Patent No.: US 7,519,692 B2
(45) Date of Patent: Apr. 14, 2009

(54) INFORMATION PROCESSING SYSTEM CONFIGURATION DESIGN SUPPORTING METHOD AND APPARATUS AND IMPLEMENTING PROGRAM THEREFOR

(75) Inventor: Masahiro Kurosawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 869 days.

(21) Appl. No.: 10/972,434

(22) Filed: Oct. 26, 2004

(65) Prior Publication Data

US 2005/0160156 A1 Jul. 21, 2005

(30) Foreign Application Priority Data

Jan. 21, 2004 (JP) ............................ 2004-013429
Jun. 9, 2004 (JP) ............................ 2004-170842

(51) Int. Cl.
*G06F 7/00* (2006.01)
(52) U.S. Cl. ................ 709/220; 709/223; 709/250; 709/224; 709/247; 709/235; 709/203; 709/217; 709/218; 709/219; 709/245
(58) Field of Classification Search ......... 709/220–225, 709/203, 245, 235, 247
See application file for complete search history.

(56) References Cited

U.S. PATENT DOCUMENTS 7,020,696 B1 * 3/2006 Perry et al. ................. 709/223

2004/0031030 A1 * 2/2004 Kidder et al. ............... 717/172

FOREIGN PATENT DOCUMENTS

JP 6-187396 7/1994

* cited by examiner

*Primary Examiner*—Jude J Jean Gilles
(74) *Attorney, Agent, or Firm*—Mattingly, Stanger, Malur & Brundidge, P.C.

(57) ABSTRACT

A design supporting method for an information processing system having a plurality of apparatuses connected via a network. Identification information of each apparatus is acquired through network connection from a network configuration design supporting apparatus. Schedule information of each identified apparatus is acquired from a storage unit and compared with a reserved time period of the information processing system, and an apparatus unavailable in the reserved time period is extracted. Identification information of each substitute apparatus for the extracted apparatus is acquired from the network configuration design supporting apparatus, schedule information of the identified substitute apparatus is acquired from the storage unit and compared with the reserved time period, and information of a substitute apparatus available in the reserved time period is output to support a change in each apparatus.

20 Claims, 13 Drawing Sheets

FIG. 5

| | ... | 7:00 | :30 | 8:00 | :30 | 9:00 | :30 | 10:00 | :30 | 11:00 | :30 | ... |
|---|---|---|---|---|---|---|---|---|---|---|---|---|
| MACHINE A | COST | 500 | | 800 | | | | 1000 | | | | |
| | RESERVED STATE | | | ■ | ■ | ■ | ■ | ■ | | | | |
| MACHINE B | COST | | | 800 | | | | | | 500 | | |
| | RESERVED STATE | ■ | ■ | ■ | ■ | | | ■ | ■ | ■ | ■ | |
| ... | | | | | | | | | | | | |

FIG. 8

| | TYPE | ATTRIBUTE INFORMATION | | | ACCESS INFORMATION |
|---|---|---|---|---|---|
| | | TYPE NUMBER | MANUFACTURE NUMBER | ... | |
| MACHINE A | APPARATUS | ABC-123 | B456-789 | | ALL USERS AVAILABLE |
| MACHINE B | APPARATUS | DEF-45 | E67890 | | ALL USERS AVAILABLE |
| MACHINE C | APPARATUS | DEF-45 | E67891 | | ONLY USER A AVAILABLE |
| MACHINE D | APPARATUS | LMN-09876 | MN678-5555 | | ONLY USER B UNAVAILABLE |
| MACHINE E | APPARATUS | OP54 | GHUK-4321 | | ONLY USERS A AND B AVAILABLE |
| MACHINE F | APPARATUS | QRS-321 | R0123 | | ALL USERS UNAVAILABLE |
| ... | | | | | |
| NETWORK A | NETWORK | NONE | NONE | | ALL USERS AVAILABLE |
| NETWORK B | NETWORK | NONE | NONE | | ONLY USERS B AND C UNAVAILABLE |
| ... | | | | | |

FIG. 9

| | | ... | 10:00 | :30 | 11:00 | :30 | 12:00 | :30 | 13:00 | :30 | 14:00 | :30 | 15:00 | :30 | 16:00 | :30 | 17:00 | :30 | ... |
|---|---|---|---|---|---|---|---|---|---|---|---|---|---|---|---|---|---|---|---|
| MACHINE A | COST | | 1000 | | | | | | 1500 | | | | 1000 | | | | 1500 | | |
| | RESERVED STATE | | | | | | | | | | | | | | | | | | | |
| MACHINE B | COST | | | | | | | | | | 500 | | | | | | | | |
| | RESERVED STATE | | | | | | | | | | | | | | | | | | | |
| MACHINE C | COST | | | | | | | | | | 500 | | | | | | | | |
| | RESERVED STATE | | | | | | | | | | | | | | | | | | | |
| MACHINE D | COST | | | | | | | | | | 450 | | | | | | | | |
| | RESERVED STATE | | | | | | | | | | | | | | | | | | | |
| MACHINE E | COST | | 500 | | | | | | | | 550 | | | | | | 500 | | |
| | RESERVED STATE | | | | | | | | | | | | | | | | | | | |
| MACHINE F | COST | | 850 | | | | | | | | 700 | | | | | | | 950 | |
| | RESERVED STATE | | | | | | | | | | | | | | | | | | | |
| ... | COST | | | | | | | | | | ... | | | | | | | | |
| | RESERVED STATE | | | | | | | | | | | | | | | | | | | |
| NETWORK A | COST | | | | | | | | | | 1100 | | | | | | | | |
| | RESERVED STATE | | | | | | | | | | | | | | | | | | | |
| NETWORK B | COST | | | | | | | | | | 900 | | | | | | | | |
| | RESERVED STATE | | | | | | | | | | | | | | | | | | | |
| ... | COST | | | | | | | | | | ... | | | | | | | | |
| | RESERVED STATE | | | | | | | | | | | | | | | | | | | |

FIG. 10

| | | | ... | 10:00 | :30 | 11:00 | :30 | 12:00 | :30 | 13:00 | :30 | 14:00 | :30 | ... |
|---|---|---|---|---|---|---|---|---|---|---|---|---|---|---|
| MACHINE A | COST | SINGLE | | 1000 | | | | | | 1500 | | | 1000 | |
| | | COMBINATION | | WITH MACHINE B : 10 % DISCOUNT | | | | | | SINGLE | | | | |
| | RESERVED STATE | | | ■ | | | | | | | | | | |
| MACHINE B | COST | SINGLE | | WITH MACHINE A : 15 % DISCOUNT | | | | 1000 | | | | | | |
| | | COMBINATION | | | | | | WITH MACHINE X : 5 % DISCOUNT | | | | | | |
| | RESERVED STATE | | | ■ | | | | ... | | | | | | |
| ... | COST | SINGLE | | | | | | | | | | | | |
| | | COMBINATION | | | | | | | | | | | | |
| | RESERVED STATE | | | | | | | | | | | | | |

INFORMATION PROCESSING SYSTEM CONFIGURATION DESIGN SUPPORTING METHOD AND APPARATUS AND IMPLEMENTING PROGRAM THEREFOR

INCORPRATION BY REFERENCE

The present application claims priorities from Japanese applications JP2004-013429 filed on Jan. 21, 2004, JP-2004-170842 filed on Jun. 9, 2004 the contents of which are hereby incorporated by reference into this application.

BACKGROUND OF THE INVENTION

The present invention relates to information processing system configuration design supporting technologies for supporting the configuration design of an information processing system, and more particularly to technologies effective for being applied to information processing system configuration design supporting technologies for supporting the design of a configuration constituted of a plurality of apparatuses interconnected by a network by considering the schedule and cost of each apparatus.

Network configuration works for configuring a plurality of apparatuses via a network are increasing. The works of selecting hardware and software to be used for configuring such a network are very complicated and require a large amount of information. In order to solve this, many techniques have been proposed for visually and interactively performing network configuration works (e.g., refer to JP-A-6-187396).

According to these techniques, abstract figures representative of apparatuses are disposed and wired by a pointing device or the like to conduct a network design on a screen of an information processing terminal, and the attribute of each apparatus constituting the network and the relation among apparatuses are set and the adequacy of this information is verified.

SUMMARY OF THE INVENTION

The above-described conventional techniques do not verify the cost of a network to be configured and a available time period. Therefore, even if the network configuration can be designed correctly, the network configuration cannot necessarily be used in a desired time period and at a desired cost. Confirming the cost and time period in advance is required to implement complicated manual works.

Furthermore, although the conventional techniques present a method of supporting the design of a single network, the conventional techniques do not present a method of designing the configuration of a plurality of networks on the same graphical user interface (GUI) screen and comparing the design results to know the advantages and disadvantages of the network configuration. Therefore, even if users can design the configuration of a plurality of networks at a plurality of sites, the design is required to be performed by using a plurality of GUI screens. When a network configuration is selected from a plurality of networks whose configuration has been designed, it is required to compare the network configurations by performing complicated manual works.

An object of the present invention is to solve the above-described problems and provide technologies capable of efficiently configuring an information processing system whose configuration design can be performed via a network and which can be used in a desired time zone.

Another object of the present invention is to provide technologies capable of efficiently configuring an information processing system desired by a user.

According to the invention, an information processing system configuration design supporting apparatus for supporting a configuration design of an information processing system constituted of a plurality of apparatuses connected via a network, supports a network configuration design by considering the schedule of each apparatus constituting the information processing system.

According to one aspect of the present invention, the information processing system configuration design supporting apparatus (which may be a computer, an information processing apparatus, or a program or object for executing necessary processes) operates as in the following. An output unit such as a display outputs selection candidates for a plurality of network configuration design supporting apparatuses, and a user selects a desired candidate from an input unit such as a keyboard. After the desired network configuration design supporting apparatus is selected, identification information and attribute information of each apparatus is acquired from the selected apparatus via a communication unit and output to an output unit. Information of the apparatus and its connection instruction or the like entered by the user is received at the input unit and transmitted to the selected apparatus via the communication unit. The configuretion design for an information processing system having the apparatus selected by the user and connected via a network is made by using the functions of the selected apparatus.

After the network configuration design of the information processing system is performed in the manner described above, the information processing system configuration design supporting apparatus according to one aspect of the present invention acquires identification information of each apparatus constituting the information processing system subjected to the network configuration design from the network configuration design supporting apparatus via the communication unit.

Thereafter, the information processing system configuration design supporting apparatus accesses a storage unit such as a magnetic disk in a schedule managing apparatus and refers to schedule information of each apparatus. The schedule information is searched in accordance with the identification information of each apparatus constituting the information processing system. The schedule information of each apparatus subjected to the network configuration design is acquired from the storage unit and stored in a memory.

Information of a reserved time period, start and end times, desired by a user of the information processing system is entered from the input unit. The acquired schedule information of each apparatus is compared with a reserved time period of the information processing system. The schedule information already reserved in the entered time zone from the start time to end time is searched from the schedule information in the memory. The apparatus having the searched schedule information is extracted as the apparatus unavailable in the reserved time period, and its identification information is stored in the memory.

The identification information stored in the memory is transmitted to the network configuration design supporting apparatus which is instructed to search a substitute apparatus same as or similar to the extracted apparatus. Identification information of the substitute apparatus is acquired from the network configuration design supporting apparatus via the communication unit. Identification information of a plurality of substitute apparatuses may be acquired for substitute apparatus candidates.

After schedule information in the memory is cleared, the storage unit such as a magnetic disk is accessed to refer to schedule information. In accordance with the acquired identification information of the substitute apparatus, the schedule information is searched and acquired from the storage unit, and the acquired schedule information is stored in the memory.

The acquired schedule information of the substitute apparatus is compared with the reserved time of the information processing system, the schedule information still not reserved in the entered time zone from the start time to end time is searched from the schedule information in the memory. The substitute apparatus having the searched schedule information is extracted as the substitute apparatus available in the reserved time, and the information of the substitute apparatus is output to the output unit to support a change in each constituent apparatus.

According to the present invention, it is possible to efficiently configure an information processing system whose configuration can be designed via a network and which can be used in a desired time zone.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram showing an example of a schedule/cost table 122 according to the first embodiment.

FIG. 8 is a diagram showing an example of an apparatus information repository 113 according to the first embodiment.

FIG. 9 is a diagram showing an example of the details of the schedule/cost table 122 according to the first embodiment.

FIG. 10 is a diagram showing another example of the schedule/cost table 122 according to the first embodiment.

DESCRIPTION OF THE EMBODIMENTS

Embodiments of the invention will be described with reference to the accompanying drawings.

First Embodiment

Description will be made on the first embodiment of an information processing system configuration design supporting system for supporting the configuration design of an information processing system constituted of a plurality of apparatuses connected by a network.

Figure 1:
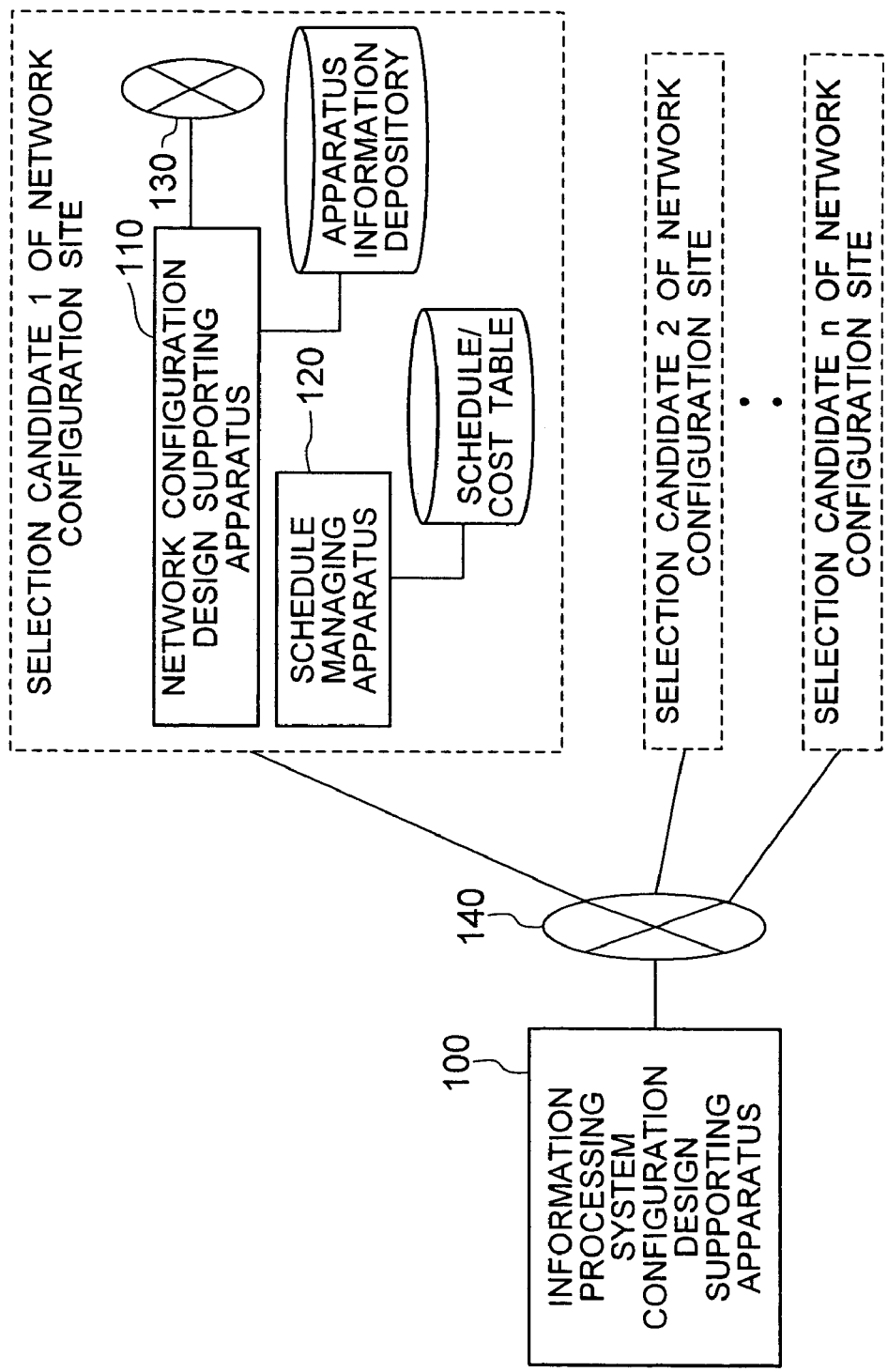
FIG. 1 is a diagram showing the overall structure of an information processing system configuration design supporting system according to a first embodiment of the present invention.

FIG. 1 is a diagram showing the overall structure of an information processing system configuration design supporting system of the first embodiment. As shown in FIG. 1, the information processing system configuration design supporting system is constituted of an information processing system configuration design supporting apparatus 100, a network configuration design supporting apparatus 110, a schedule managing apparatus 120, a network 130 and a network 140.

The information processing system configuration design supporting apparatus 100 is an information processing apparatus for supporting a network configuration design while considering the schedule and cost of each apparatus constituting an information processing system, in accordance with the information of the network configuration design supporting apparatus 110 and schedule managing apparatus 120.

The network configuration design supporting apparatus 110 is an information processing apparatus for supporting the network configuration design by verifying whether each apparatus constituting the information processing system can be used by the network. The schedule managing apparatus 120 is an information processing apparatus for managing the schedule and cost of each apparatus constituting the information processing system.

The network 130 is a communication route which is managed by the network configuration design supporting apparatus 110 and connected to actual apparatuses stored as abstract models in an apparatus information repository in the form of abstract models, and can change the network configuration at once by effectively utilizing a virtual network or the like. The network 140 is a communication route for connecting the information processing system configuration design supporting apparatus 100, network configuration design supporting apparatus 110 and schedule managing apparatus 120.

Figure 2:
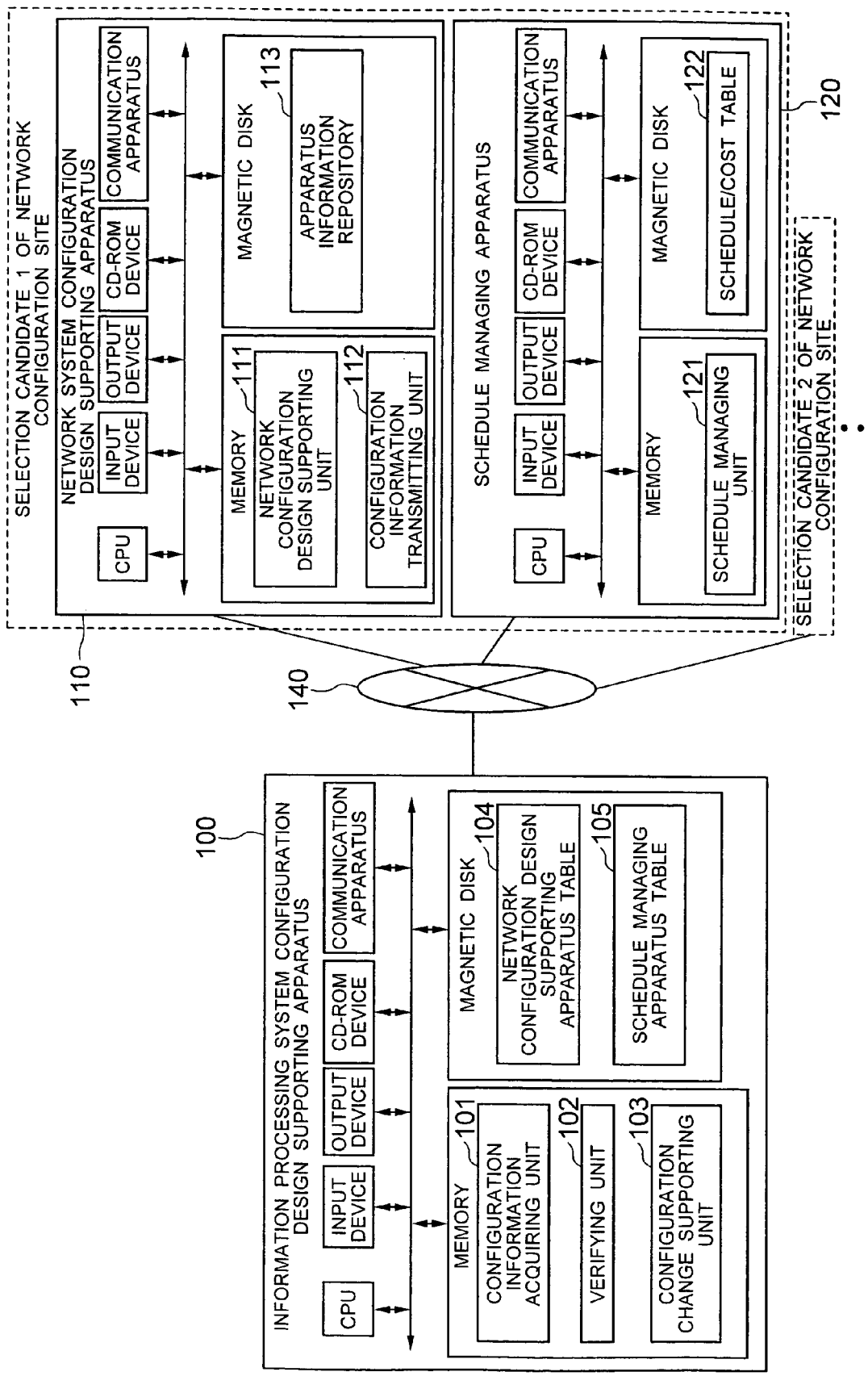
FIG. 2 is a diagram showing the outline structure of the information processing system configuration design supporting system according to the first embodiment.

FIG. 2 is a diagram showing the outline structure of the information processing system configuration design supporting system of the first embodiment. As shown in FIG. 2, the information processing system configuration design supporting apparatus 100 has a configuration information acquiring unit 101, a verifying unit 102 and a configuration change supporting unit 103.

The configuration information acquiring unit 101 is a processing unit for acquiring identification information of each apparatus or each substitute apparatus constituting the information processing system from the network configuration design supporting apparatus 110, through network connection via a communication apparatus.

The verifying unit 102 is a processing unit for acquiring the schedule information of each apparatus identified by the acquired identification information from a schedule/cost table 122 in a magnetic disk of the schedule managing apparatus 120, comparing the acquired schedule information with a reserved time period of the information processing system and extracting the apparatus unavailable during the reserved time period.

The configuration change supporting unit 103 is a processing unit for acquiring the schedule information of a substitute apparatus from the schedule/cost table 122 by using the identification information of the substitute apparatus for the extracted apparatus, comparing the acquired schedule information with the reserved time period of the information processing system, and supporting a change in the configured apparatus by outputting from an output apparatus the information of the substitute apparatus available during the reserved time period.

It is assumed that programs for making the information processing system configuration design supporting apparatus 100 function as the configuration information acquiring unit 101, verifying unit 102 and configuration change supporting unit 103 are recorded in a recording medium such as a CD-ROM, stored in a magnetic disk or the like, thereafter loaded in a memory, and executed. The recording medium for storing the programs may be other recording media different from CD-ROM. The programs may be used by storing them in an information processing apparatus from the recording medium, or by accessing the recording medium via the network.

The information processing system configuration design supporting apparatus 100 has also a network configuration design supporting apparatus table 104 and a schedule managing apparatus table 105.

The network configuration design supporting apparatus table 104 is a table storing information of a available network configuration design supporting apparatus 110. The schedule managing apparatus table 105 is a table storing information of the schedule managing apparatus 120 which manages the schedule of each apparatus used by the network configuration design.

The network configuration design supporting apparatus 110 has a network configuration design supporting unit 111 and a configuration information transmitting unit 112.

The network configuration design supporting unit 111 is a processing unit for receiving at a communication apparatus information of an apparatus selected by a user, an apparatus connection instruction and the like from the information processing system configuration design supporting apparatus 100 via the communication apparatus and for supporting the configuration design of the information processing system to which the apparatus selected by the user is connected via the network.

The configuration information transmitting unit 112 is a processing unit for transmitting the identification information of each apparatus or its substitute apparatus constituting the information processing system through network connection from the communication apparatus to the information processing system configuration design supporting apparatus 100.

It is assumed that programs for making the network configuration design supporting apparatus 110 function as the network configuration design supporting unit 111 and configuration information transmitting unit 112 are recorded in recording medium such as a CD-ROM, stored in a magnetic disk or the like, thereafter loaded in a memory, and executed. The recording medium for storing the programs may be other recording media different from CD-ROM. The programs may be used by storing them in an information processing apparatus from the recording medium, or by accessing the recording medium via the network.

The network configuration design supporting apparatus 110 also has an apparatus information repository 113. The apparatus information repository 113 is a repository for storing attribute information of each apparatus for each piece of the identification information of the apparatus constituting the information processing system, access information for identifying a available user, and other information.

The schedule managing apparatus 120 has a schedule managing unit 121. The schedule managing unit 121 is a processing unit for managing the reserved state and cost of each apparatus constituting the information processing system.

It is assumed that programs for making the schedule managing apparatus 120 function as the schedule managing unit 121 are recorded in recording medium such as a CD-ROM, stored in a magnetic disk or the like, thereafter loaded in a memory, and executed. The recording medium for storing the programs may be other recording media different from CD-ROM. The programs may be used by storing them in an information processing apparatus from the recording medium, or by accessing the recording medium via the network.

The schedule managing apparatus 120 also has a schedule/cost table 122. The schedule/cost table 122 is a table for storing schedule information representative of the reserved state of each apparatus constituting the information processing system and cost information representative of the cost of each apparatus corresponding to the time period and the combination of the apparatus with other apparatuses.

Figure 3:
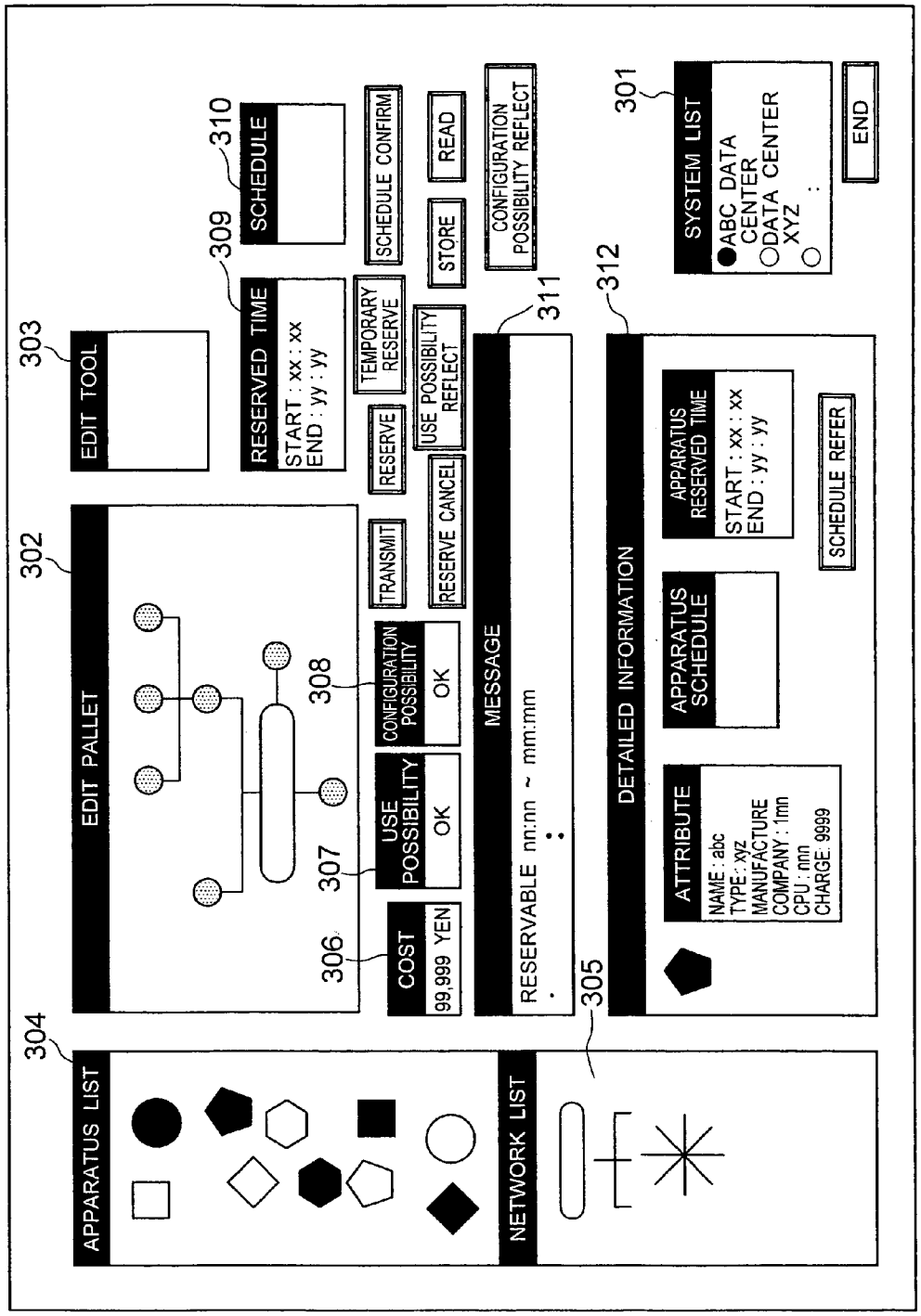
FIG. 3 is a diagram showing an example of an operation screen of an information processing system configuration design supporting apparatus 100 according to the first embodiment.

FIG. 3 is a diagram showing an example of an operation screen of the information processing system configuration design supporting apparatus 100 of the first embodiment. As shown in FIG. 3, the information processing system configuration design supporting apparatus 100 displays a list of network configuration design supporting apparatuses 110 available by a user operating the apparatus 100 (hereinafter simply called a user) on a system list 301 on the operation screen. When any one of the network configuration design supporting apparatuses 110 in the system list 301 is selected, lists of apparatuses and networks available by the user are displayed in an apparatus list 304 and a network list 305, respectively. The user disposes the apparatuses and networks selected from the apparatus list 304 and network list 305 on an edit pallet to design the network.

Upon depression of a transmission button, the information processing system configuration design supporting apparatus 100 transmits the design results in the edit pallet 302 to the presently selected network configuration design supporting apparatus 110. The network configuration design supporting apparatus 110 verifies the transmitted contents, and returns OK or NG. The information processing system configuration design supporting apparatus 100 displays the OK/NG result on a configuration possibility 308. Without depression of the transmission button, the verification result may be automatically displayed in the configuration possibility 308 at a proper timing.

When a configuration possibility reflection button is depressed while the result corresponding to NG is displayed in the configuration possibility 308, the information processing system configuration design supporting apparatus 100 displays the apparatus in the edit pallet 302 causing the NG result in an emphasized state such as a changed color.

The information processing system configuration design supporting apparatus 100 displays attribute information of the apparatus selected from the apparatus list 304, network list 305 or edit pallet 302 in an attribute column of detailed information 312. When a schedule reference button is depressed, schedule information of the apparatus is displayed. For example, information of whether the apparatus has been reserved is displayed in the unit of minute. The information may be displayed by finely classifying it, such as whether the apparatus is in use or at rest, or displayed in the unit shorter than minute. Without depression of the schedule reference button, the schedule may be displayed automatically in the apparatus schedule column at a proper timing.

If the apparatus in the edit pallet 302 is selected, the information processing system configuration design supporting apparatus 100 can set the time period while the apparatus is used, in an apparatus reserved time column. For example, start and end times may be set as y:m:d:h:m, an intermediate non-use time zone may be set, and the information may be set in the unit shorter than minute.

In a reserved time 309, the time when the whole network configuration shown in the edit pallet 302 is used, can be set. For example, similar to the apparatus reserved time column, start and end times may be set as y:m:d:h:m, an intermediate non-use time zone may be set, and the information may be set in the unit shorter than minute.

Upon depression of a reservation button while the use time period is set in the reserved time 309 or the time period is set in the apparatus reserved time column of the detailed information 312 for all apparatuses in the edit pallet 302, the information processing system configuration design supporting apparatus 100 inquires the schedule managing apparatus 120 corresponding to the presently selected network configuration design supporting apparatus 110 about the reservation possibility, if the reservation is possible, makes the schedule managing apparatus 120 change the schedule (set information of the reservation), and displays the reservation possibility in a use possibility 307.

Upon depression of a temporary reservation button, the information processing system configuration design supporting apparatus 100 inquires the schedule managing apparatus 120 about the reservation possibility, and the schedule managing apparatus 120 may return only a reservation possibility without changing the schedule. The information processing system configuration design supporting apparatus 100 displays the result in the use possibility 307.

When a use possibility reflection button is depressed while the result corresponding to NG is displayed in the use possibility 307, the information processing system configuration design supporting apparatus 100 displays the apparatus in the edit pallet 302 causing the NG result (reserving the whole network configuration is impossible because the apparatus is not available in the designated reserved time period) in an emphasized state such as a changed color.

Upon reception of a schedule confirmation button, the information processing system configuration design supporting apparatus 100 displays in a schedule 310 the available time period for the whole network configuration in the edit pallet 302. Upon depression of the schedule confirmation button, the schedule may be displayed automatically in the schedule 310 at a proper timing.

The information processing system configuration design supporting apparatus 100 displays the total cost of the whole network configuration in the edit pallet 302, in a cost 306 at a proper timing. Upon depression of a certain button, the total cost may be displayed.

Upon depression of a storage button, the information processing system configuration design supporting apparatus 100 stores the network configuration in the edit pallet 302 together with the information of the presently selected network configuration design supporting apparatus 110, in a file. Upon depression of a read button, the network configuration is restored from the file into the edit pallet 302.

In this case, even if the network configuration design supporting apparatus 110 when the network configuration is stored is different from the network configuration design supporting apparatus 110 selected by the system list 301 when the read button is depressed, the read operation is executed and the verifying process described along with the configuration possibility 308 is executed. It is therefore possible to confirm whether the configuration can be executed by using another network configuration design supporting apparatus 110, and if not executable, to locate the apparatus causing the NG result.

Figure 4:
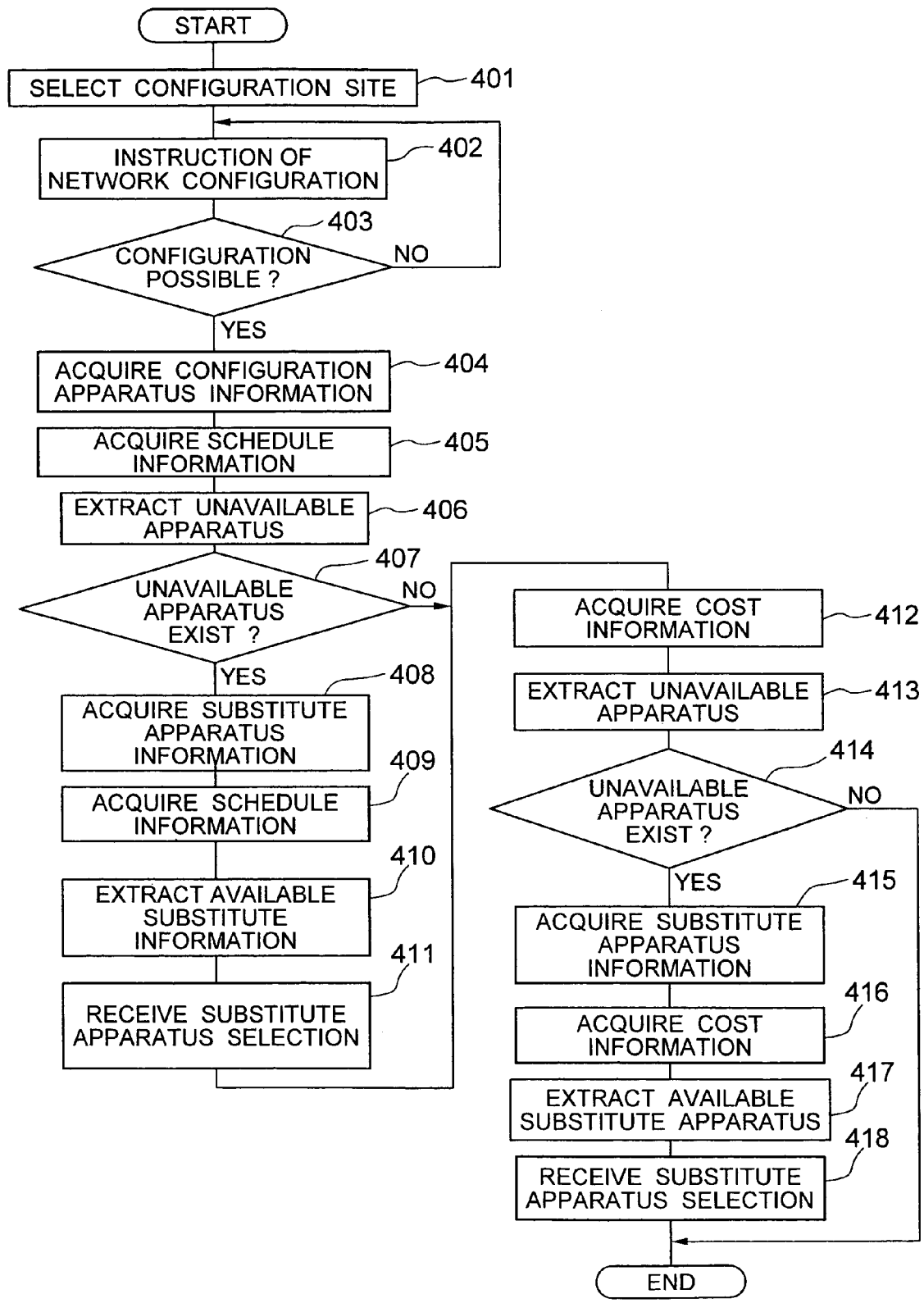
FIG. 4 is a flow chart illustrating the process sequence of the information processing system configuration design supporting apparatus 100 according to the first embodiment.

FIG. 4 is a flow chart illustrating a process sequence of the information processing system configuration design supporting apparatus 100 of the first embodiment. At Step 401, the information processing system configuration design supporting apparatus 100 of the first embodiment reads selection candidates for selecting a predetermined apparatus from a plurality of network configuration design supporting apparatuses 110 and outputs them as the system list 301 to the output unit such as a display, and a user selects a desired selection candidate from the system list 301 by using the input unit such as a mouse and a keyboard. In accordance with the selected candidate, information such as a transmission address of the corresponding network configuration design supporting apparatus 110 is read from the network configuration design supporting apparatus table 104. Thereafter, the identification information of the user such as a user ID is transmitted from the communication apparatus to the network configuration design supporting apparatus 110 to make the apparatus 110 transmit the information of apparatuses available by the user.

The configuration information transmitting unit 112 of the network configuration design supporting apparatus 110 reads from the apparatus information repository 113 only the information of apparatuses available by the user among those apparatuses managed by the apparatus information repository 113 in the magnetic disk, and transmits it from the communication apparatus to the information processing system configuration design supporting apparatus 100.

At Step 402, the information processing system configuration design supporting apparatus 100 acquires via the communication apparatus the identification information and attribute information from the network configuration design supporting apparatus 110 and outputs the information to the output unit as the apparatus list 304 and network list 305. The user enters from the input unit information of a selected apparatus, an apparatus connection instruction and the like and depresses the transmission button so that the information is transmitted from the communication apparatus to the network configuration design supporting apparatus 110. The network configuration design supporting apparatus 110 is instructed to design the configuration of the information processing system connecting the apparatus selected by the user to the network.

The network configuration design supporting unit 111 of the network configuration design supporting apparatus 110 receives at the communication apparatus the information of the apparatus selected by the user, an apparatus connection instruction and the like from the information processing system configuration design supporting apparatus 100 via the communication apparatus, verifies whether the apparatus can be connected, and executes a process of supporting to design the configuration of the information processing system connecting the apparatus selected by the user to the network.

At Step 403, the information processing system configuration design supporting apparatus 100 receives at the communication apparatus the process results such as information of whether the apparatus selected by the user can be connected to the network, from the network configuration design supporting apparatus 110, and displays the process results on the output unit as the configuration possibility 308. If the process results indicate that the apparatus can be connected to the network, the process advances to Step 404, whereas if not, the process returns to Step 402 whereat the selection process by the user is again performed.

After the network configuration design for the information processing system is performed in the manner described earlier, at Step 404 the configuration information acquiring unit 101 of the information processing system configuration design supporting apparatus 100 instructs the network configuration design supporting apparatus 110 to transmit from the communication apparatus the identification information of each apparatus constituting the information processing system in the edit pallet 302 for which the network configuration design has been performed.

Upon reception of this transmission instruction, the configuration information transmitting unit 112 of the network configuration design supporting apparatus 110 transmits the identification information of each apparatus constituting the information processing system from the communication apparatus to the information processing system configuration design supporting apparatus 100. The configuration information acquiring unit 101 of the information processing system configuration design supporting apparatus 100 acquires at the communication apparatus the identification information of each apparatus constituting the information processing system from the network configuration design supporting apparatus 110.

At Step 405, the verifying unit 102 of the information processing system configuration design supporting apparatus 100 reads the schedule managing apparatus 120 managing the schedule of each apparatus identified by the acquired identification information, from the schedule managing apparatus table 105. Thereafter, the verifying unit 102 accesses the storage device such as the magnetic disk in the schedule managing apparatus 120, refers to the schedule/cost table 122 storing the schedule information of each apparatus, searches the schedule/cost table 122 in accordance with the identification information of each apparatus constituting the information processing system, acquires from the storage device the schedule information of each apparatus for which the network configuration design has been performed, and stores the acquired schedule information in the memory.

FIG. 5 is a diagram showing an example of the schedule/cost table 122 of the first embodiment. As shown in FIG. 5, the schedule/cost table 122 stores schedule information representative of the reserved state and cost information representative of the cost, for each machine name representative of the identification information of each apparatus. For example, a machine A is reserved during the period from 7:30 to 10:30, and the cost of the machine A is 500 Yen until 8:30 and 1,000 Yen during the period from 8:30 to 11:30. The schedule/cost table 122 also stores cost information representative of the cost of each combination of apparatuses, e.g., a 10% discount for the combination of the machines A and B.

At Step 406, after the information including start and end times of the reserved time period desired by a user intending to use the information processing system is input to the input device from the reserved time 309, the acquired schedule information of each apparatus is compared with the reserved time period of the information processing system, the information of the already reserved time period during the time period from the input start time to end time is searched from the schedule information in the memory, the apparatus corresponding to the searched schedule information is extracted as the apparatus unavailable during the reserved time period, and the identification information of the apparatus is stored in the memory.

For example, if the machines A and B are included in the edit pallet 302 and the start and end times input to the reserved time 309 is 11:00 to 16:00 and the machine B is reserved during the time period from 10:00 to 12:00, then the machine B is extracted as an unavailable machine because the reserved time period of the machine B partially overlaps the reserved time period from 11:00 to 16:00.

At Step 407 it is checked whether the process results at Step 406 indicate there is any apparatus unavailable during the reserved time period among those apparatuses constituting the information processing system. If there is any unavailable apparatus, the flow advances to Step 408, whereas if not, the flow skips to Step 412.

At Step 408, the configuration information acquiring unit 101 outputs the information of the apparatus identified by the identification information stored in the memory to the output device and displays the reason of unusability, transmits the identification information to the network configuration design supporting apparatus 110, and instructs the network configuration design supporting apparatus 110 to search a substitute apparatus same as or similar to the extracted apparatus.

Figure 6:
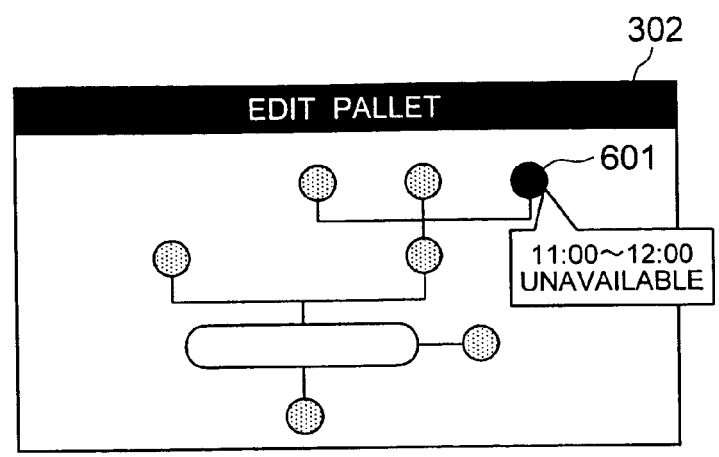
FIG. 6 is a diagram showing an example of displaying an unavailable apparatus according to the first embodiment.

FIG. 6 is a diagram showing a display example of an unavailable apparatus according to the first embodiment. For example, if the apparatus indicated in an apparatus display 601 in the edit pallet 302 is the extracted machine B, a process is executed to indicate the cause of unusability by displaying the apparatus display 601 in an emphasized state such as a changed color as shown in FIG. 6.

Upon reception of the search or transmission instruction, the configuration information transmitting unit 112 of the network configuration design supporting apparatus 110 searches, as the substitute apparatus for each apparatus constituting the information processing system, the apparatus having the attribute information such as a CPU processing ability same as or similar to that of the apparatus having the identification information transmitted together with the transmission instruction, and transmits the identification information of the searched apparatus from the communication apparatus to the information processing system configuration design supporting apparatus 100. The configuration information acquiring unit 101 of the information processing system configuration design supporting apparatus 100 acquires the identification information of the substitute apparatus for each apparatus constituting the information processing system from the network configuration design supporting apparatus 110 at the communication apparatus.

At Step 409, the configuration change supporting unit 103 of the information processing system configuration design supporting apparatus 100 clears the schedule information on the memory, accesses the storage device such as a magnetic disk in the schedule managing apparatus 120 to refer to the schedule/cost table 122, searches the schedule/cost table 122 by using the acquired identification information of the substitute apparatus to acquire the schedule information of the substitute apparatus from the storage device, and stores the acquired schedule information in the memory.

At Step 410, the acquired schedule information of the substitute apparatus is compared with the reserved time period of the information processing system, the information of still not reserved the time period during the time period from the input start time to end time, is searched from the schedule information in the memory, the substitute apparatus corresponding to the searched schedule information is extracted as the substitute apparatus available in the reserved time period, and the information of the substitute apparatus is output from the output unit to the edit pallet 302.

Figure 7:
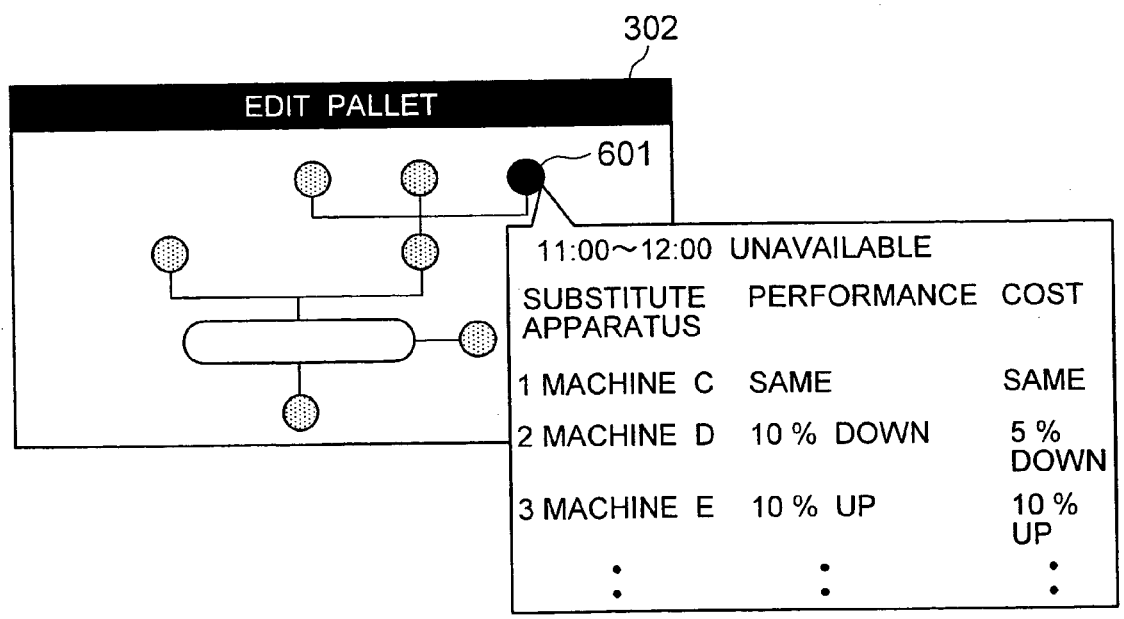
FIG. 7 is a diagram showing an example of displaying a substitute apparatus according to the first embodiment.

FIG. 7 is a diagram showing a display example of a substitute apparatus according to the first embodiment. In the example shown in FIG. 7, if the apparatus indicated in the apparatus display 601 in the edit pallet 302 is the machine B extracted as an unavailable apparatus, machines C, D and E are displayed in the edit pallet 302 which machines have the processing ability same as or similar to that of the machine B and are available in the reserved time period. A change degree in the processing ability and cost may also by displayed by comparing with those of the machine B to aid the user to select a desired one.

The user refers to the information of each substitute apparatus output to the output device, selects from the input device the substitute apparatus for the apparatus constituting the information processing system. At Step 411, the configuration change supporting unit 103 receives an input representative of the substitute apparatus selected by the user, and changes the identification information of each apparatus constituting the information processing system in accordance with the received contents.

At Step 412, the verifying unit 102 accesses the storage device such as a magnetic disk in the schedule managing apparatus 120, refers to the schedule/cost table 122 storing the cost information of each apparatus, searches the schedule/cost table 122 in accordance with the identification information of each apparatus constituting the information processing system, acquires the cost information of each apparatus subjected to the network configuration design from the storage device, and stores the acquired cost information in the memory.

In this case, if the schedule/cost table 122 stores the cost information including information of the cost changing with a time zone and information of the cost changing with a combination of apparatuses, and this information may be acquired to calculate the cost corresponding to the time zone and apparatus combination and store the calculated cost in the memory.

At Step 413, the information of an allowable cost capable of being paid by the user when the information processing system is used, is input from the input unit, the acquired cost information of each apparatus is compared with the allowable cost for the information processing system, the cost information exceeding the input allowable cost is searched from the cost information in the memory, the apparatus corresponding to the searched cost information is extracted as the apparatus unavailable because the cost is higher than the allowable cost, and the identification information of the apparatus is stored in the memory.

In this case, when the apparatus in excess of the allowable cost is to be extracted, the allowable cost per one apparatus is input to compare with the cost of each apparatus, and the allowable cost per the whole information processing system is input to compare with the cost obtained by adding the cost of each apparatus. When the cost becomes in excess of the allowable cost per the whole information processing system, a process of extracting the apparatuses whose costs had been added and the apparatuses whose costs are still not added, or other processes are executed. In this case, for the apparatus whose cost changes if it is used with other apparatuses, the cost for the apparatus combination is converted into the cost per one apparatus to be used for cost addition. When the cost of each apparatus is added, the cost may be added in the order of apparatus having higher processing ability or in the predetermined order to thereby extract unavailable apparatuses in a predetermined priority order.

At Step 414, it is checked from the process results at Step 413 whether there is any unavailable apparatus which became in excess of the allowable cost, among those apparatuses constituting the information processing system. If there is any unavailable apparatus, the flow advances to Step 415.

At Step 415, the configuration information acquiring unit 101 outputs the information of the apparatus identified by the identification information stored in the memory to the output unit to display the cause of unusability, transmits the identification information to the network configuration design supporting apparatus 110, and instructs the network configuration design supporting apparatus 110 to search the substitute apparatus same as or similar to the extracted apparatus. In this case, the display for the unavailable apparatus is similar to that shown in FIG. 6.

Upon reception of the search or transmission instruction, the configuration information transmitting unit 112 of the network configuration design supporting apparatus 110 searches, as the substitute apparatus for each apparatus constituting the information processing system, the apparatus having the attribute information such as a CPU processing ability same as or similar to that of the apparatus having the identification information transmitted together with the transmission instruction, and transmits the identification information of the searched apparatus from the communication apparatus to the information processing system configuration design supporting apparatus 100. The configuration information acquiring unit 101 of the information processing system configuration design supporting apparatus 100 acquires the identification information of the substitute apparatus for each apparatus constituting the information processing system from the network configuration design supporting apparatus 110 at the communication apparatus.

At Step 416, the configuration change supporting unit 103 of the information processing system configuration design supporting apparatus 100 clears the cost information on the memory, accesses the storage device such as a magnetic disk in the schedule managing apparatus 120 to refer to the schedule/cost table 122, searches the schedule/cost table 122 by using the acquired identification information of the substitute apparatus to acquire the cost information of the substitute apparatus from the storage device, and stores the acquired cost information in the memory.

At Step 417, the acquired cost information of the substitute apparatus is compared with the allowable cost for the information processing system, the information not in excess of the allowable cost is searched from the cost information in the memory, the substitute apparatus corresponding to the searched cost information is extracted as the substitute apparatus available below the allowable cost, and the information of the substitute apparatus is output from the output unit.

The user refers to the information of each substitute apparatus output to the output device, selects from the input device the substitute apparatus for the apparatus constituting the information processing system.

At Step 418, the configuration change supporting unit 103 receives an input representative of the substitute apparatus selected by the user, and changes the identification information of each apparatus constituting the information processing system in accordance with the received contents. Since there may exist the apparatus changed due to the cost and became unavailable during the reserved time period, after Step 418, the flow may return to Step 405 to extract the apparatus unavailable during the reserved time period. Alternatively, at Step 416 the schedule information of the substitute apparatus may be acquired, and at Step 417 the schedule information of the substitute apparatus is compared with the reserved time period of the information processing system to extract the available substitute apparatus satisfying both the reserved time period and allowable cost.

In the information processing system configuration design supporting apparatus 100 of the first embodiment, it may be judged whether the information processing system configured by the above-described configuration design supporting process can be configured by another network configuration design supporting apparatus 110.

Namely, immediately after the information processing system is configured in the manner described above or after the information of the configured information processing system once stored is read, the information processing system configuration design supporting apparatus 100 operates in the following manner. From another network configuration design supporting apparatus 110 selected by a user, the attribute information of the apparatus available by the user such as a CPU processing ability and a connection protocol is acquired at the communication apparatus, and the acquired information is stored in the memory. The attribute information of each apparatus constituting the information processing apparatus, such as a CPU processing ability and a connection protocol, is compared with the acquired attribute information of each apparatus available by the other network configuration design supporting apparatus 110, such as a CPU processing ability and a connection protocol. It is checked among those apparatuses constituting the information processing system whether there is any unavailable apparatus not equivalent to that for the other network configuration design supporting apparatus 110 or not connectable by the same protocol. If all apparatuses constituting the information processing system can be used by the other network configuration design supporting apparatus 110, an indication that the information processing system can be configured by the other network configuration design supporting apparatus 110 is output to the output unit as the configuration possibility 308. If there is any unavailable apparatus among those apparatuses constituting the information processing system, an indication that the information processing system cannot be configured by the other network configuration design supporting apparatus 110 is output to the output unit as the configuration possibility 308.

If it is judged that the information processing system cannot be configured, the information of the apparatus causing the configuration inability, i.e., the apparatus unavailable by the network configuration design supporting apparatus 110 among those apparatuses constituting the information processing system, is output from the output unit to the edit pallet 302 to inform the user of the cause of configuration inability, similar to that shown in FIG. 6.

Next, the details of the apparatus information repository 113 will be described. FIG. 8 is a diagram showing an example of the apparatus repository 113 of the first embodiment. As shown in FIG. 8, the apparatus information repository stores attribute information such as a type number and a manufacture number, and access information for identifying a available user, or each machine name which is the identification information of the machine. For example, this repository indicates that a machine A has a type of an apparatus, a type number of ABC-123, a manufacture number of B456-789 and that the machine A can be used by a user capable of using the network configuration design supporting apparatus 110. A machine B has a type of an apparatus, a type number of DEF-45, a manufacture number of E67891 and can be used by only a user A among those users capable of using the network configuration design supporting apparatus 110.

At Step 401 shown in FIG. 4, the configuration information transmitting unit 112 of the network configuration design supporting apparatus 110 reads the apparatus available by the user among the apparatuses managed by the repository 113, by judging from the access information, and transmits the apparatus information together with the attribute information from the communication apparatus to the information processing system configuration design supporting apparatus 100. At Step 402, the information processing system configuration design supporting apparatus 100 acquires at the communication apparatus the transmitted information and outputs it to the output unit as the apparatus list 304 and network list 305.

The attribute information may be not only the type number and manufacture number but also other information such as information of the performance including a CPU processing ability and the like, use object information if the object is limited, such as a database server and a Web server, and information of whether the apparatus can be substituted for another apparatus or a network. The access information is not limited only to the usability of each user, but the usability of a group of users may also be used. The type is not limited only to the apparatus and network, but the type may be a finer classification such as a database apparatus and a Web server apparatus. The apparatus list 304 and network list 305 shown in FIG. 3 are not limited only thereto, but they may be a finer classification such as a data base apparatus list and a Web server apparatus.

Next, the details of Step 410 will be described. FIG. 9 is a diagram showing an example of the details of the schedule/cost table 122 of the first embodiment. FIG. 9 shows an example of the details of the schedule/cost table 122. For example, if the identification information of machines C, D, E and F is acquired at Step 408, then at Step 410 the machines C, D and E having no reserved time period overlapping the reserved time period from 11:00 to 16:00 are extracted as the substitute apparatuses available during the reserved time period, and the information of these substitute apparatuses is output from the output unit to the edit pallet 302.

The process at Step 408 will be described more specifically. At Step 408, the detailed information is output to the output unit to display the cause of unusability, the information indicating, for example, that the unusability results from another already reserved time period during the reserved time period input to the reserved time 309. The user can again try the process of Step 402 and following Steps by changing the input values in the reserved time 309.

Another example of the schedule/cost table 122 shown in FIG. 5 will be described. FIG. 10 is a diagram showing another example of the schedule/cost table 122 of the first embodiment. Some network configuration design supporting apparatuses 110 have apparatuses and networks which are desired to be used more frequently in particular time zones because the availability factor is desired to be increased in the particular time zones.

FIG. 10 shows specific contents of the discount described with reference to FIG. 5. For example, although the cost of the machine A is 1,000 Yen until 11:30 if the machine A is used singularly, if the machine A is used together with a machine B, the cost of the machine is reduced by 10% to 900 Yen. This table also indicates that after 12:00, the cost is the same as that when the machine A is used singularly even if it is combined with any other machine.

As described so far, according to the information processing system configuration design supporting apparatus, since the network configuration design is supported by considering the schedule of each apparatus constituting the information processing system, the network configuration design is possible and the information processing system capable of using in a desired time zone can be configured efficiently.

Second Embodiment

Description will be made on an information processing system configuration design supporting apparatus of the second embodiment in which a plurality of network configuration candidates are held and when a network configuration having a higher priority order can be realized, the reserved network configuration is changed. The overall structure of the information processing system configuration design supporting system of the second embodiment is the same as that of the first embodiment.

Figure 11:
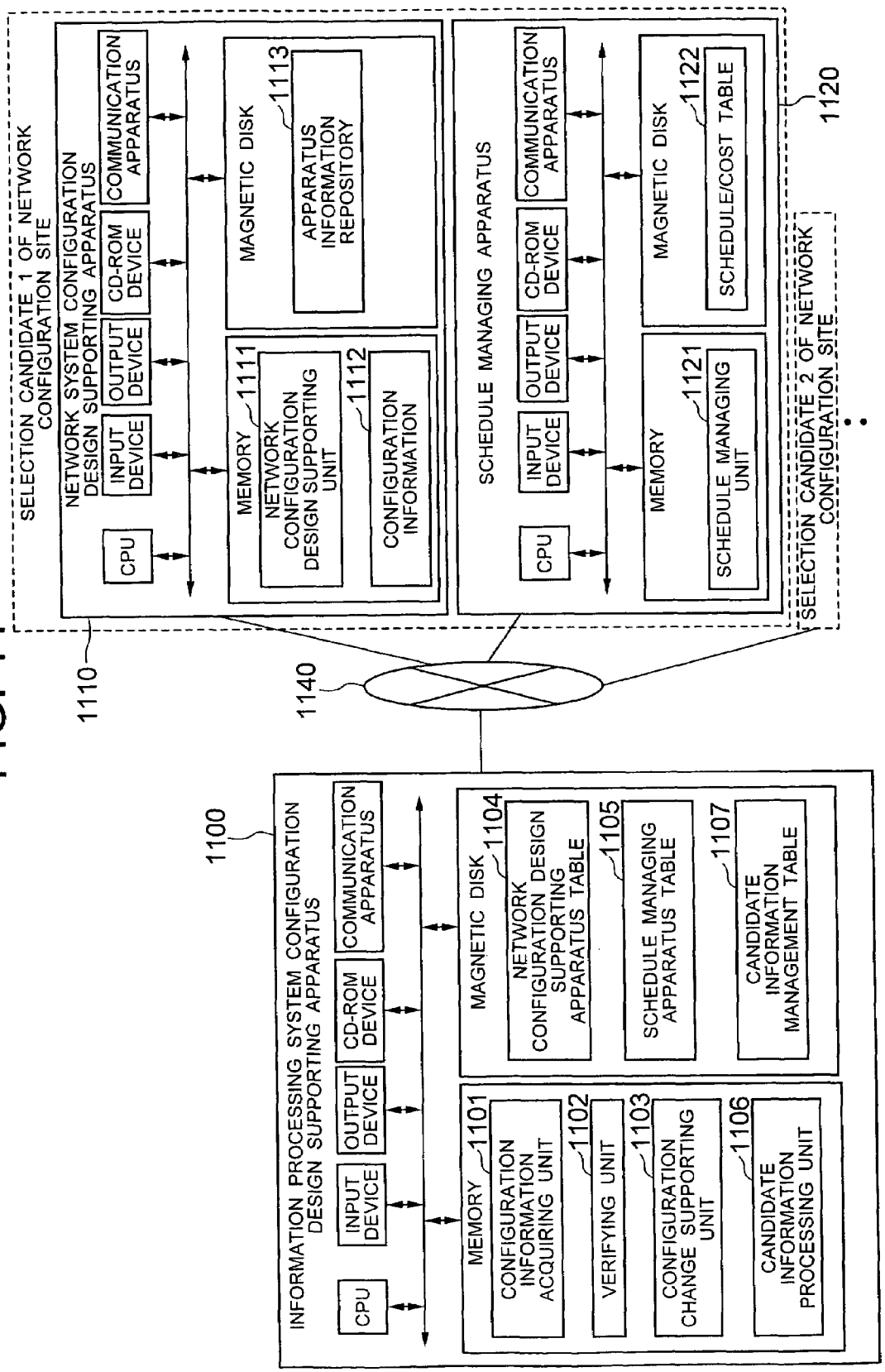
FIG. 11 is a diagram showing the outline structure of an information processing system configuration design supporting system according to a second embodiment of the present invention.

FIG. 11 is a diagram showing the outline structure of an information processing system configuration design supporting system of the second embodiment. As shown in FIG. 11, an information processing system configuration design supporting apparatus 1100 is constituted of a configuration information acquiring unit 1101, a verifying unit 1102, a configuration change supporting unit 1103 and a candidate information processing unit 1106.

The configuration information acquiring unit 1101, verifying unit 1102 and configuration change supporting unit 1103 are similar to the configuration information acquiring unit 101, verifying unit 102 and configuration change supporting unit 103 of the first embodiment. The candidate information processing unit 1106 is a processing unit for managing the configurations of a plurality of information processing systems by using a candidate information management table 1107, cancelling the reservation of a lower priority order information processing system when each apparatus constituting the information processing becomes reservable, and reserving the information processing system which became reservable, in accordance with the priority order set by a processing ability, cost and the like of each information processing system.

It is assumed that programs for making the information processing system configuration design supporting apparatus 1100 function as the configuration information acquiring unit 1101, verifying unit 1102, configuration change supporting unit 1103 and candidate information processing unit 1106 are recorded in a recording medium such as a CD-ROM, stored in a magnetic disk or the like, thereafter loaded in a memory, and executed. The recording medium for storing the programs may be other recording media different from CD-ROM. The programs may be used by storing them in an information processing apparatus from the recording medium, or by accessing the recording medium via the network.

The information processing system configuration design supporting apparatus 1100 has also a network configuration design supporting apparatus table 1104, a schedule managing apparatus table 1105 and a candidate information management table 1107.

The network configuration design supporting apparatus table 1104 and schedule managing apparatus table 1105 are similar to the network configuration design supporting apparatus table 104 and schedule managing apparatus table 105 of the first embodiment. The candidate information management table 1107 is a table storing the information of the configurations and priority order of a plurality of information processing systems.

The network configuration design supporting apparatus 1110 and schedule managing apparatus 1120 have the structures similar to those of the network configuration design supporting apparatus 110 and schedule managing apparatus 120 of the first embodiment.

Figure 12:
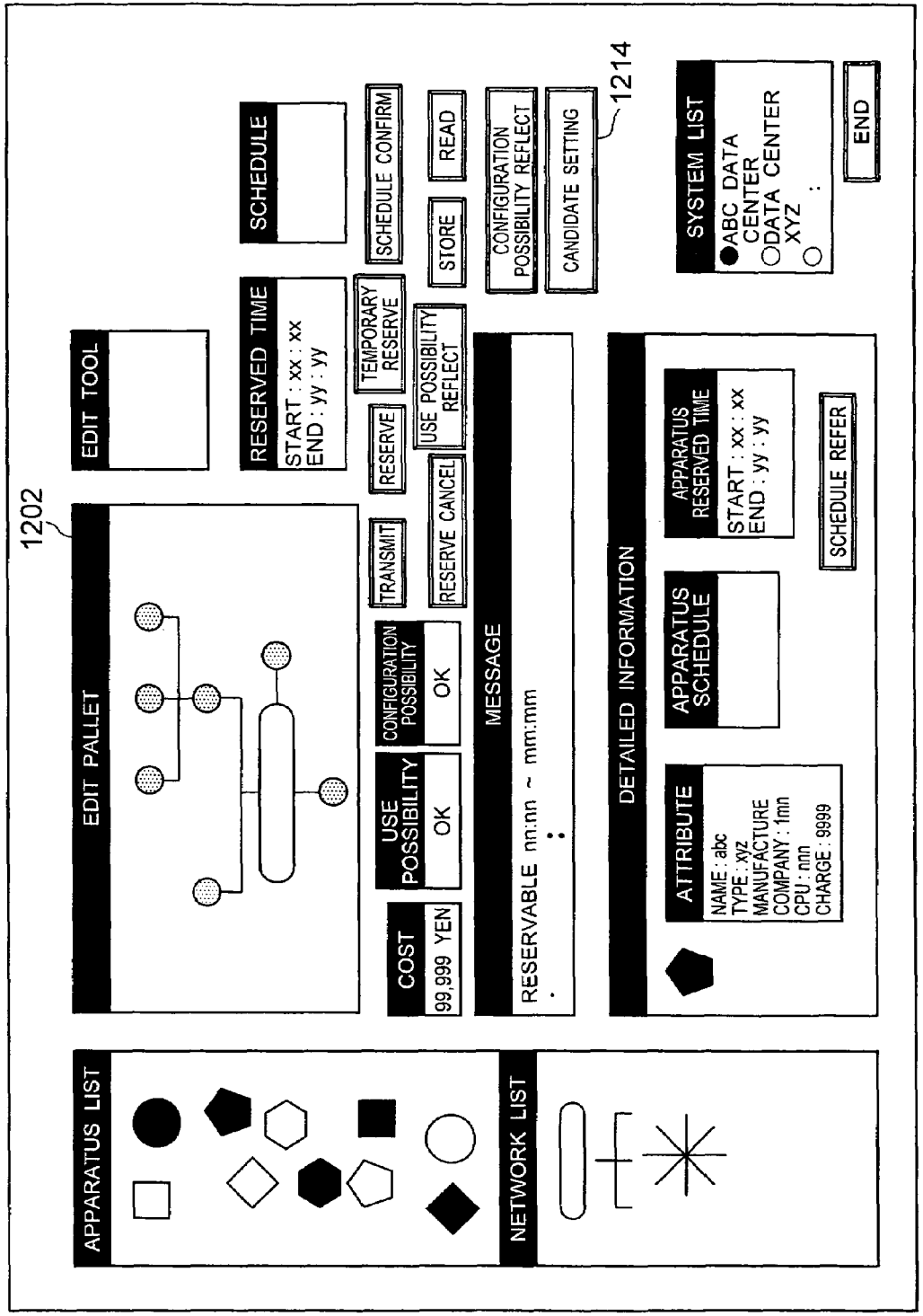
FIG. 12 is a diagram showing an example of an operation screen of an information processing system configuration design supporting apparatus 1100 according to the second embodiment.
Figure 13:
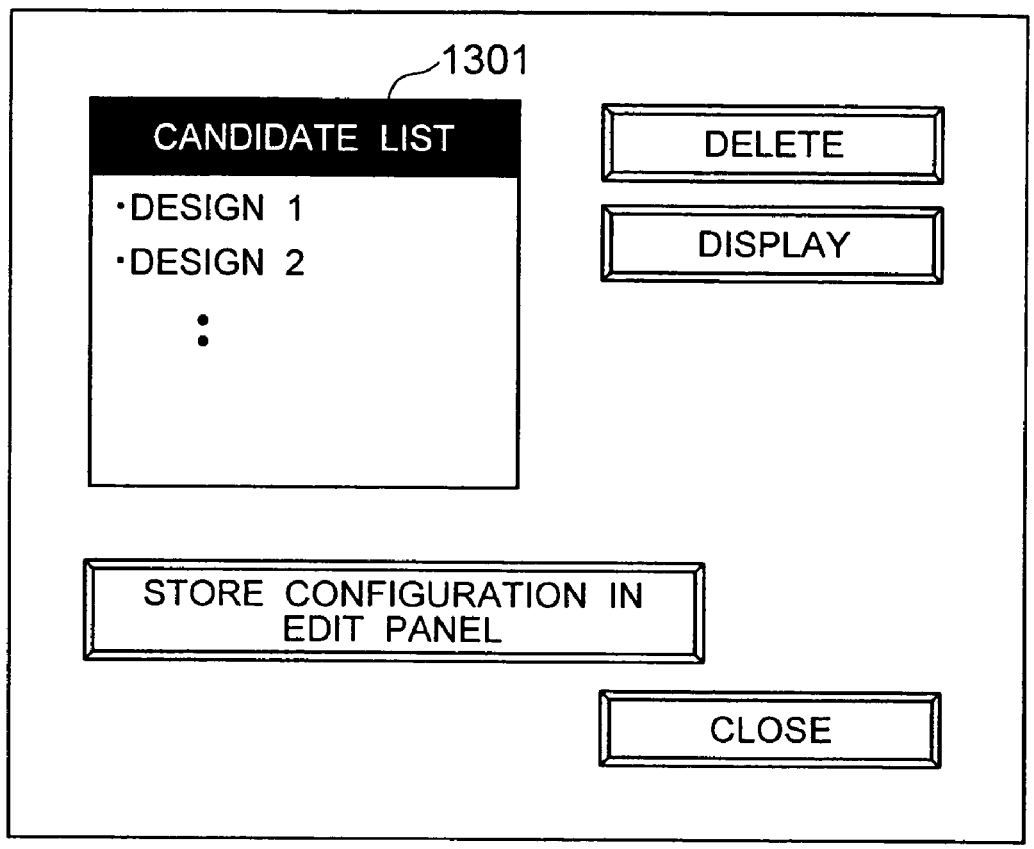
FIG. 13 is a diagram showing an example of a candidate setting screen of the information processing system configuration design supporting apparatus 1100 according to the second embodiment.

FIG. 12 is a diagram showing an example of an operation screen of the information processing system configuration design supporting apparatus 1100 of the second embodiment. FIG. 13 is a diagram showing an example of a candidate setting screen of the information processing system configuration design supporting apparatus 1100 of the second embodiment. As shown in FIGS. 12 and 13, the screens are similar to the example of the operation screen of the first embodiment, excepting a candidate setting button 1214 shown in FIG. 12 and the screen shown in FIG. 13.

Upon depression of the candidate setting button 1214, the information processing system configuration design supporting apparatus 1100 displays the screen shown in FIG. 13. The screen shown in FIG. 13 may be part of the screen shown in FIG. 12 or it may be displayed always independently from the depression of the candidate setting button 1214.

Upon depression of a button "store configuration in edit pallet" shown in FIG. 13, the candidate information processing unit 1106 of the information processing system configuration design supporting apparatus 1100 stores the network configuration (configuration information including the identification information of each apparatus constituting the information processing system) displayed in an edit pallet 1202, together with the information on the presently selected network configuration design supporting apparatus 1110, the information on a reserved time 309, the information on the allowable cost, and the name supplied to the user, in the candidate information management table 1107 in the magnetic disk. Hereinafter, the name is called a candidate name and a set of information to be stored in the table is called candidate information.

The candidate information processing unit 1106 acquires the information representative of a processing ability corresponding to the identification information of each apparatus in the stored network configuration, and sets the information indicating that the priority order is high in the order of high processing ability of each apparatus of the information processing system, to the candidate information management table 1107 in the magnetic disk.

The priority order may be set in accordance with the cost. In this case, the candidate information processing unit 1106 acquires the cost information corresponding to the identification information of each apparatus in the stored network configuration, and sets the information indicating that the priority order is high in the order of lower cost relative to the total cost of the information processing system, to the candidate information management table 1107 in the magnetic disk.

The priority order set in this manner may be changed in response to an instruction from a user. In this case, the information processing system configuration design supporting apparatus 1100 reads the candidate name stored in the candidate information management table 1107 in the magnetic disk, and displays it on the output device such as a display in a candidate list 1301. The candidate name in the candidate list has a higher priority order if it is displayed at an upper position of the list. The priority order of the candidate name in the candidate list 1301 is changed by using the input unit such as a mouse and a keyboard to renew the priority order information in the candidate information management table 1107.

After the candidate name in the candidate list 1301 is selected by using the input unit such as a mouse and a keyboard, if a delete button is depressed, the information processing system configuration design supporting apparatus 1100 deletes the candidate name selected in the candidate list 1301 from the candidate list 1301 or deletes the candidate information corresponding to the candidate name from the candidate information management table 1107. If a display button is depressed, the candidate information corresponding to the candidate name selected in the candidate list 1301 is read from the candidate information management table 1107 to restore the network configuration on the edit pallet 1202.

The candidate name may be changed by using a name change button, or the network configuration corresponding to the candidate name and the information on the network configuration design supporting apparatus 1110 may be stored in the candidate information management table by using a copy button.

If the process in the first embodiment extracts an apparatus unavailable in the reserved time period from the information processing system whose candidate information has been stored, the information of the information processing system may be stored in the candidate information management table 1107 as the candidate information.

Namely, similar to the process of the first embodiment, the identification information of each apparatus constituting the information processing system is acquired through network connection at the communication apparatus from the network configuration design supporting apparatus 1110, and the schedule information of each apparatus identified by the acquired identification information is acquired from the magnetic disk of the schedule managing apparatus 1120 to be compared with the reserved time period of the information processing system to extract the apparatus unavailable in the reserved time period. If the apparatus unavailable in the reserved time period is extracted, the information of the information processing system is stored as the candidate information in the candidate information management table 1107 in the magnetic disk.

The attribute information of an apparatus available by the user may be extracted at the communication apparatus from another network configuration design supporting apparatus and compared with the attribute information of each apparatus in the candidate information management table 1107. In this case, if this comparison finds a similar apparatus, the apparatus in the candidate information in the candidate information management table 1107 is replaced with the apparatus of the other network configuration design supporting apparatus. The corresponding candidate information is added to the candidate information management table 1107 to automatically generate the candidate information of the other network configuration design supporting apparatus.

If the candidate information management table 1107 has one or more pieces of the candidate information, the information processing system configuration design supporting apparatus 1110 confirms regularly, e.g., at an equal time interval, whether the network configuration design supporting apparatus 1100 corresponding to the candidate information can configure and reserve the network configuration corresponding to the candidate information, before the start time of the network configuration. If the candidate information has a higher priority order than that of the presently reserved candidate information, the present reservation is cancelled and a new reservation is made in accordance with this candidate information.

This process may start not in response to the even of the number of candidate information pieces in the candidate information management table 1107, but in response to depression of a priority start button (not shown) by a user. The process may be performed not periodically but in response to a notice from the network configuration design supporting apparatus 1110 such as an occurrence of a cancelled reservation. The reservation cancel and new reservation may be performed after a notice is output to the display or the like and a user confirms to perform the reservation cancel and new reservation.

Figure 14:
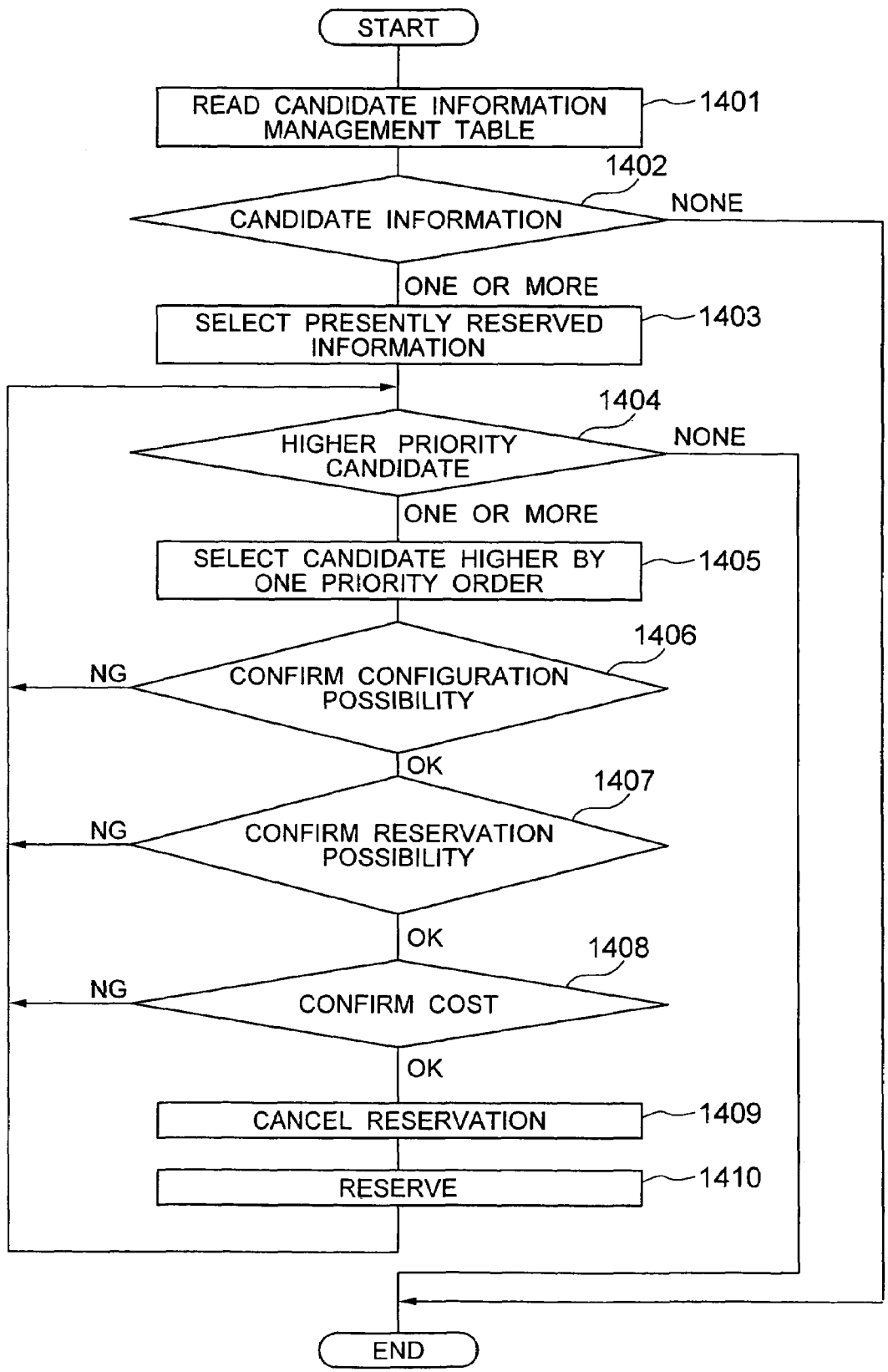
FIG. 14 is a flow chart illustrating the process sequence of the information processing system configuration design supporting apparatus 1100 according to the second embodiment.

FIG. 14 is a flow chart illustrating the process sequence of the information processing system configuration design supporting apparatus 1100 of the second embodiment. At Step 1401, the candidate information processing unit 1106 of the information processing system configuration design supporting apparatus 1100 of the second embodiment reads the candidate information from the candidate information management table 1107 in the magnetic disk which stores the information of each information processing system as a reservation candidate together with the priority order information. In this embodiment, it is assumed that although the information of the presently reserved information processing system is also stored as the candidate information in the candidate information management table 1107, the information of the presently reserved information processing system may be stored in another storage area.

If there is at Step 1402 one or more pieces of read candidate information excluding the information of the presently reserved information processing system, the candidate information processing unit 1106 advances to Step 1403, whereas if not, the process is terminated. At Step 1403, the information of the presently reserved information processing system is searched from the read candidate information, and the searched information is set as the presently selected candidate information.

Next at Step 1404, if there is one or more candidates having a higher priority order than that of the presently selected candidate, the candidate information processing unit 1106 advances to Step 1405, whereas if not, the process is terminated. At Step 1405, the candidate higher by one priority order than that of the presently selected candidate is selected to renew the presently selected candidate.

At Step 1406, the information processing system configuration design supporting apparatus 1100 inquires and confirms the network configuration design supporting apparatus 1110 about whether the network configuration of the selected candidate can be configured. It is assumed that as described in the first embodiment, this confirmation is performed by the network configuration design supporting unit 1111 of the network configuration design supporting apparatus 1110. If the confirmation result indicates that the configuration is possible, the flow advances to Step 1407, whereas if not, the flow returns to Step 1404 whereat a process is executed which confirms whether there is a candidate having a priority order higher than that of the presently selected candidate.

At Step 1407, the verifying unit 1102 of the information processing system configuration design supporting apparatus 1100 inquires and confirms the network configuration design supporting apparatus 1110 about whether the network configuration of the selected candidate can be reserved.

Namely, the verifying unit 1102 acquires a machine name, which is the identification information of each apparatus of the information processing system, from the candidate information of the presently selected candidate, and compares the acquired machine name with the machine name of each apparatus of the reserved information processing system to extract the machine name among the acquired machine names which name is not contained in the reserved information processing system. The schedule information corresponding to the extracted machine name is acquired from the magnetic disk of the schedule managing apparatus 1120, and compared with the reserved time period of the reserved information processing system to thereby confirm whether the apparatus having this machine name can be used during the reserved time period. If the confirmation result indicates that the apparatus can be used, the flow advances to Step 1408, whereas if not, the flow returns to Step 1404 whereat a process is executed which process confirms whether there is a candidate having a priority order higher than that of the presently selected candidate.

Next at Step 1408, the verifying unit 1102 of the information processing system configuration design supporting apparatus 1100 confirms whether the network configuration of the selected candidate can be performed not in excess of the allowable cost. This confirmation is similar to the process described in the first embodiment. The cost information of each apparatus identified by the identification information in the selected candidate information is acquired from the magnetic disk of the schedule managing apparatus 1120, and is compared with the allowable cost of the reserved information processing system to confirm whether the network configuration is not in excess of the allowable cost. If the confirmation result indicates that the network configuration does not exceed the allowable cost, the flow advances to Step 1409, whereas if not, the flow returns to Step 1404 whereat a process is executed which process confirms whether there is a candidate having a priority order higher than that of the presently selected candidate.

At Step 1409, the candidate information processing unit 1106 of the information processing system configuration design supporting apparatus 1100 transmits from the communication apparatus an instruction of cancelling the reservation of the presently information processing system to the schedule managing apparatus 1120, and the schedule managing apparatus 1120 corresponding to the presently reserved network configuration design supporting apparatus 1110 changes the schedule to delete the information of the reservation.

At Step 1410, the candidate information processing unit 1106 of the information processing system configuration design supporting apparatus 1100 transmits from the communication apparatus an instruction of reserving the information processing system of the presently selected candidate, and the schedule managing apparatus 1120 corresponding to the network configuration design supporting apparatus 1110 of the selected candidate changes the schedule to set the reservation of the presently selected candidate.

The process of instructing the presently reserved contents to be changed from the presently reserved information processing system to the information processing system having a higher priority order, may be performed by transmitting only the information of the apparatus whose reservation is to be changed, to thereby efficiently perform the change process.

Namely at Step 1409, the machine name of each apparatus constituting the reserved information processing system may be compared with the machine name of each apparatus constituting the information processing system of the selected candidate to extract the machine name among the acquired machine names in the reserved information processing system which name is not contained in the information processing system of the selected candidate. The communication apparatus transmits an instruction of cancelling the reservation for the extracted machine name, to the schedule managing apparatus 1120. At Step 1410, a similar comparison process is executed to extract the machine name among the acquired machine names in the selected information processing system which name is not contained in the reserved information processing system. The communication apparatus transmits an instruction of reserving the apparatus of the extracted machine name, to the schedule managing apparatus 1120.

The processes from Step 1404 to Step 1410 are executed so long as the candidate information management table 1107 has a candidate having a higher priority order than that of the presently reserved candidate. Therefore, the reservation is changed to the candidate having a higher priority order if the configuration is possible by satisfying the reserved time period desired by a user and the allowable cost.

As described so far, according to the information processing system configuration design supporting apparatus of this embodiment, a plurality of network configurations are held as candidates, and when the network configuration having a higher priority order can be realized, the reservation is changed. It is therefore possible to efficiently configure the information processing system desired by a user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information processing system configuration design method supporting a configuration design of an information processing system constituted of a plurality of apparatuses connected via a network, the method being performed by a computer of an information processing system configuration supporting apparatus and comprising the steps of:

acquiring identification information of each apparatus constituting said information processing system through network connection from a network configuration design supporting a apparatus using a communication means caused by said computer to perform said step of acquiring identification information;

acquiring schedule information of each apparatus identified by said acquired identification information from a storage, comparing said acquired schedule information with a reserved time period of said information processing system, and extracting an apparatus unavailable in the reserved time period;

acquiring identification information of each substitute apparatus for said extracted apparatus from said network configuration design supporting apparatus by using the communication means; and acquiring schedule information of the substitute apparatus identified by said acquired identification information from the storage, comparing said acquired schedule information with the reserved time period of said information processing system, and outputting information of a substitute apparatus available in the reserved time period through an output unit caused by said computer to perform said outputting step, to support a change in each constituent apparatus.

2. An information processing system configuration design method according to claim 1, further comprising the steps of:

acquiring cost information of each apparatus identified by said acquired identification information from the storage, comparing the acquired cost information with an allowable cost of said information processing system, and extracting an apparatus unavailable because of exceeding the allowable cost;

acquiring at the communication means identification information of each substitute apparatus for said acquired apparatus from the network configuration design supporting apparatus; and acquiring the cost information of the substitute apparatus identified by said acquired identification information from the storage, comparing the cost information with the allowable cost of said information processing system, and outputting information of a substitute apparatus not in excess of the allowable cost from the output unit to support a change in each constituent apparatus.

3. An information processing system configuration design method according to claim 2, wherein information representative of a cost different in each time zone is acquired as said cost information from the storage, a cost in said reserved time period is calculated, and the calculated cost is compared with the allowable cost of said information processing system.

4. An information processing system configuration design method according to claim 2, wherein information representative of a cost for a combination of apparatuses to be used is acquired as said cost information from the storage, a cost in said reserved time period is calculated, and the calculated cost is compared with the allowable cost of said information processing system.

5. An information processing system configuration design method according to claim 1, wherein information of said extracted unavailable apparatus is output to the output unit to display a cause of unavailability.

6. An information processing system configuration design method according to claim 1, wherein a selection of one of a plurality of network configuration design supporting apparatus candidates entered by a user is received at an input unit caused by said computer to receive said selection, and only information of an apparatus available by the user among apparatuses managed by a storage of said selected network configuration design supporting apparatus is read and acquired from the storage.

7. An information processing system configuration design method according to claim 6, wherein attribute information of an apparatus available by a user is acquired via the communication means from another network configuration design supporting apparatus to be used by the user, the acquired attribute information is compared with the attribute information of each apparatus subjected to network configuration design, it is judged whether the other network configuration design supporting apparatus can configure said information processing system by using the apparatus subjected to the network configuration design, and a judgment result is output from the output unit.

8. An information processing system configuration design method according to claim 7, wherein if it is judged that said information processing system cannot be configured, information of the apparatus causing configuration inability is output from the output unit.

9. A computer-readable recording medium storing a program which, when executed by a computer, causes the computer to perform an information processing system configuration design method supporting a configuration design of an information processing system constituted of a plurality of apparatuses connected via a network, the method comprising the steps of:

acquiring identification information of each apparatus constituting said information processing system through network connection from a network configuration design supporting apparatus by using a communication means;

acquiring schedule information of each apparatus identified by said acquired identification information from a storage, comparing said acquired schedule information with a reserved time period of said information processing system, and extracting an apparatus unavailable in the reserved time period;

acquiring identification information of each substitute apparatus for said extracted apparatus from said network configuration design supporting apparatus by using the communication means; and acquiring schedule information of the substitute apparatus identified by said acquired identification information from the storage, comparing said acquired schedule information with the reserved time period of said information processing system, and outputting information of a substitute apparatus available in the reserved time period from an output unit to support a change in each constituent apparatus.

10. An information processing system configuration design apparatus supporting a configuration design of an information processing system constituted of a plurality of apparatuses connected via a network, comprising:

a configuration information acquiring unit for acquiring identification information of each apparatus or each substitute apparatus therefor constituting said information processing system through network connection from a network configuration design supporting apparatus by using a communication means;

a verifying unit for acquiring schedule information of each apparatus identified by said acquired identification information from a storage, comparing said acquired schedule information with a reserved time period of said information processing system, and extracting an apparatus unavailable in the reserved time period; and a configuration change supporting unit for acquiring, in accordance with identification information of each substitute apparatus for said extracted apparatus, schedule information of the substitute apparatus acquired from the storage, comparing said acquired schedule information with a reserved time period of said information processing system, and outputting information of a substitute apparatus available in the reserved time period from an output unit to support a change in each constituent apparatus.

11. An information processing system configuration design method supporting a configuration design of an information processing system constituted of a plurality of apparatuses connected via a network, the method being performed by a computer of an information processing system configuration supporting apparatus and comprising the steps of:

reading a candidate information management table from a storage, said candidate information management table storing information of each reservation candidate information processing system together with information of a priority order of the reservation candidate information processing system, and selecting candidate information of said information processing system having the priority order higher than the priority order of a reserved information processing system;

acquiring schedule information of each apparatus identified by identification information in said selected candidate information from the storage, comparing the acquired schedule information with a reserved time period of the reserved information processing system, and confirming whether the apparatus is available in the reserved time period; and if the apparatus is available in the reserved time period, transmitting from a communication means to a schedule managing apparatus an instruction of changing presently reserved contents from the reserved information processing system to said information processing system to said information processing system having the higher priority order, said communication means being caused by said computer to perform said transmitting step.

12. An information processing system configuration design method according to claim 11, further comprising a step of acquiring cost information of each apparatus identified by said selected candidate information from the storage, and comparing the acquired cost information with an allowable cost of said reserved information processing system to confirm whether the apparatus is in excess of the allowable cost, wherein if the apparatus is not in excess of the allowable cost, said reserved contents are changed.

13. An information processing system configuration design method according to claim 11, wherein information representative of the priority order is set to said candidate information management table in the storage, in accordance with a processing capability of each apparatus of said information processing system.

14. An information processing system configuration design method according to claim 11, wherein information representative of the priority order is set to said candidate information management table in the storage, in accordance with cost information of each apparatus of said information processing system.

15. An information processing system configuration design method according to claim 11, wherein a process is executed by said computer which: acquires identification information of each apparatus constituting said information processing system through network connection from a network configuration design supporting apparatus by using a communication means caused by said computer to acquire said identifiable information; acquires schedule information of each apparatus identified by said acquired identification information from a storage; compares said acquired schedule information with a reserved time period of said information processing system; and extracts an apparatus unavailable in the reserved time period, wherein if the apparatus unavailable in the reserved time period is extracted, information of said information processing system is stored as the candidate information in said candidate information management table in the storage.

16. An information processing system configuration design method according to claim 11, wherein attribute information of an apparatus available to a user is acquired via the communication means from another network configuration design supporting apparatus to be used by the user, the candidate information replacing each apparatus in the candidate information in said candidate information management table with each apparatus of said other network configuration design supporting apparatus is generated and stored in said candidate information management table.

17. An information processing system configuration design method supporting a configuration design of an information processing system constituted of a plurality of apparatuses connected via a network, the method being performed by a computer of an information processing system configuration supporting apparatus and comprising the steps of:

reading a candidate information management table from a storage, said candidate information management table storing information of each reservation candidate information processing system together with information of a priority order of the reservation candidate information processing system, and selecting candidate information of said information processing system having the priority order higher than the priority order of a reserved information processing system;

acquiring schedule information of each machine name not contained in said reserved information processing system among machine names in said selected candidate information from the storage, comparing the acquired schedule information with a reserved time period of the reserved information processing system, and confirming whether the apparatus of the machine name is available in the reserved time period; and if the apparatus of the machine name is available in the reserved time period, transmitting from a communication means to the schedule managing apparatus an instruction of changing presently reserved contents from the reserved information processing system to said information processing system having the higher priority order, said communication means being caused by said computer to perform said transmitting step.

18. An information processing system configuration design apparatus supporting a configuration design of an information processing system constituted of a plurality of apparatuses connected via a network, comprising:

a candidate information processing unit for reading a candidate information management table from a storage, said candidate information management table storing information of each reservation candidate information processing system together with information of a priority order of the reservation candidate information processing system, and selecting candidate information of said information processing system having the priority order higher than the priority order of a reserved information processing system; and a verifying unit for acquiring schedule information of each apparatus identified by identification information in said selected candidate information from the storage, comparing the acquired schedule information with a reserved time period of the reserved information processing system, and confirming whether the apparatus is available in the reserved time period.

19. An information processing system configuration design hardware system supporting a configuration design of an information processing system constituted of a plurality of apparatuses connected via a network, comprising:

an information processing system configuration design supporting apparatus comprising: a candidate information processing unit for reading a candidate information management table from a storage, said candidate information management table storing information of each reservation candidate information processing system together with information of a priority order of the reservation candidate information processing system, and selecting candidate information of said information processing system having the priority order higher than the priority order of a reserved information processing system; and a verifying unit for acquiring schedule information of each apparatus identified by identification information in said selected candidate information from the storage, comparing the acquired schedule information with a reserved time period of the reserved information processing system, and confirming whether the apparatus is available in the reserved time period; and a schedule managing apparatus for receiving the instruction from the information processing system configuration design supporting apparatus at the communication means and changing presently reserved contents from said reserved information processing system to said information processing system having the higher priority order.

20. A computer-readable recording medium storing a program which, when executed by a computer, causes the computer to perform an information processing system configuration design method supporting a configuration design of an information processing system constituted of a plurality of apparatuses connected via a network, the method comprising the steps of:

reading a candidate information management table from a storage, said candidate information management table storing information of each reservation candidate information processing system together with information of a priority order of the reservation candidate information processing system, and selecting candidate information of said information processing system having the priority order higher than the priority order of a reserved information processing system;

acquiring schedule information of each apparatus identified by identification information in said selected candidate information from the storage, comparing the acquired schedule information with a reserved time period of the reserved information processing system, and confirming whether the apparatus is available in the reserved time period; and if the apparatus is available in the reserved time period, transmitting from the communication means to a schedule managing apparatus an instruction of changing presently reserved contents from the reserved information processing system to said information processing system having the higher priority order.

* * * * *